(12) United States Patent
Novak

(10) Patent No.: US 7,180,279 B2
(45) Date of Patent: Feb. 20, 2007

(54) METHOD FOR DRIVING PULSE-WIDTH-CONTROLLED INDUCTIVE LOADS, AND A DRIVE CIRCUIT FOR THIS PURPOSE

(75) Inventor: Heinz Novak, Graz (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/127,047

(22) Filed: May 10, 2005

(65) Prior Publication Data

US 2005/0264272 A1    Dec. 1, 2005

(30) Foreign Application Priority Data

May 10, 2004    (DE) ................. 10 2004 022 947

(51) Int. Cl.
*G05F 1/40*    (2006.01)
(52) U.S. Cl. .............. 323/283; 323/222; 327/540; 363/123; 363/79
(58) Field of Classification Search ............ 363/97–98, 363/26, 34, 37, 41, 16, 25, 132; 323/282–290; 327/535–541
See application file for complete search history.

(56) References Cited

U.S. PATENT DOCUMENTS 5,077,652 A * 12/1991 Faley ................. 363/97
6,031,707 A   2/2000 Meyer
6,850,426 B2 * 2/2005 Kojori et al. ............. 363/123
6,992,468 B2 * 1/2006 Kranz ................. 323/283
2002/0050579 A1   5/2002 Near

FOREIGN PATENT DOCUMENTS

DE    198 24 761 A1    7/1999
DE    199 07 505 A1    9/1999

* cited by examiner

*Primary Examiner*—Rajnikant B. Patel
(74) *Attorney, Agent, or Firm*—Maginot, Moore & Beck

(57) ABSTRACT

When a switch (20) that is in series with the inductive load (10) is turned on, the rise behavior of the current (I) is first of all detected until a nominal value (Iref) is reached, and a pulse duty factor (Te/Ta) of a pulse width modulator device (30) is determined from said rise behavior. Immediately after the nominal value (Iref) of the current (I) has been reached, the switch (20) is driven in a conventional manner by the pulse width modulator device (30), using the pulse duty factor (Te/Ta) that has been determined, in order to finely adjust the pulse duty factor (Te/Ta). The invention largely avoids overshoots during control and the adjustment time is thus considerably shorter than in conventional drive circuits.

20 Claims, 3 Drawing Sheets

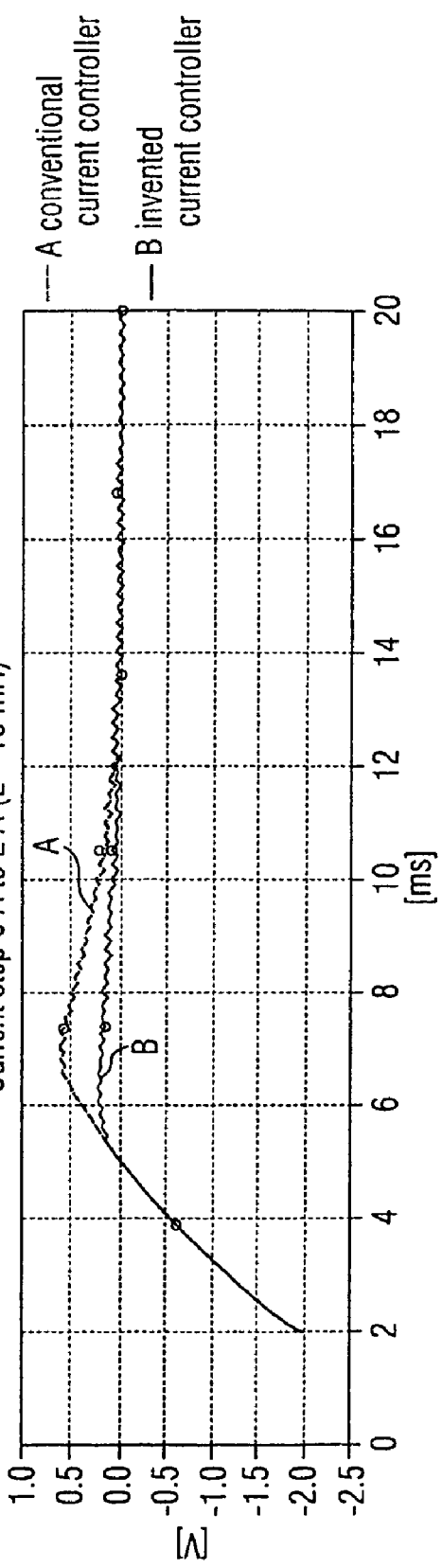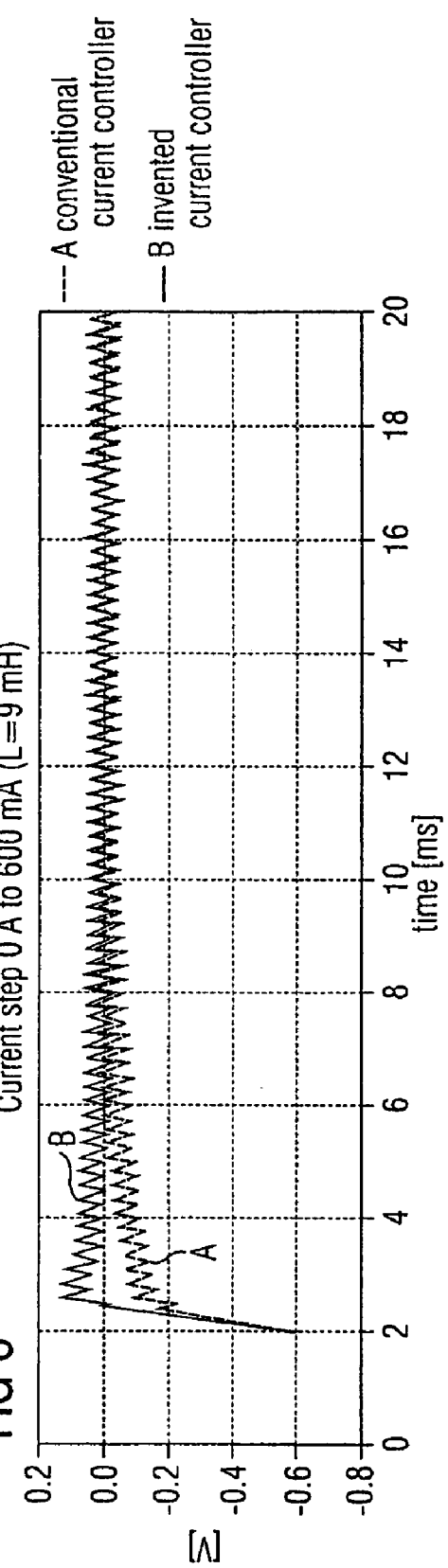

METHOD FOR DRIVING PULSE-WIDTH-CONTROLLED INDUCTIVE LOADS, AND A DRIVE CIRCUIT FOR THIS PURPOSE

FIELD OF THE INVENTION

The invention relates to a method for driving an inductive load in a pulse-width-modulated manner, and to a drive circuit for this purpose.

BACKGROUND

DE 198 24 761 A1, for example, discloses such a method and such a drive circuit.

FIG. 1 shows the basic design of such a known drive circuit. The series circuit of an inductive load 10 and a switch 20 is arranged between supply terminals 1, 2. The inductive load 10 may, for example, be a solenoid valve of an injection pump in diesel motor vehicles. Also in series with the inductive load 10 are a non-reactive resistor 12 and a further resistor 14 which is used as a current measuring resistor in order to detect the current flowing through the inductive load 10. The anode connection of a diode 16 (whose cathode connection is connected to the supply terminal 2) may be connected between the junction point of the switch 20 and the measuring resistor 14. By way of example, the positive pole of a voltage supply is connected to the supply terminal 2 and reference-ground potential of the voltage supply is connected to the supply terminal 1.

So that the current I flowing through the inductive load 10 can follow a prescribed nominal current Iref as accurately as possible, the known circuit arrangement of FIG. 1 has a pulse width modulator device 30 which turns the switch 20 on and off in a pulse-width-modulated manner. On the input side, the pulse width modulator device 30 has a PI controller 32 which has a pulse width modulator 34 connected downstream of it. A current error signal Ierr which is formed from the difference between the nominal current Iref and the actual current Iact measured across the measuring resistor 14 is supplied to the input of the PI controller 32. Since, in the circuit arrangement shown in FIG. 1, the nominal current Iref is in the form of a digital value, for example in the form of an 18-bit value, it is likewise necessary to convert the analog value (ascertained using the measuring resistor 14) of the actual current Iact into a digital value. An amplifier 22 which is connected, on the output side, to an analog/digital converter 24 and is connected to the measuring resistor 14 is used for this purpose. The digital value for the actual current Iact is available at the output of the analog/digital converter 24.

The problem with such drive circuits is the fact that they are optimized only for a single load situation. This means that an optimum transient response is ensured only in the case of a particular load situation. The actual current through the inductive load follows the prescribed nominal current only in this particular load situation. If, however, the load conditions change, the transient time may vary considerably. In particular, overshooting may result during control, which considerably extends the adjustment time in a disadvantageous manner. This relatively long overshooting is observed, in particular, in the case of large current jumps of the nominal current.

SUMMARY

The aim of the present invention is to avoid these disadvantages and to specify a method and a drive circuit in the case of which the transient response of the actual current is considerably improved in comparison with conventional methods and drive circuits.

The invention is essentially based on the fact that, after the prescribed nominal current has been reached, the pulse width modulator device turns the switch on and off using a pulse duty factor that was determined from the current rise behavior when the current through the inductive load was turned on or from the current decay behavior when the current through the inductive load was turned off.

A fundamental part of the present invention is an assessment circuit which is preferably digital and determines the pulse duty factor of the pulse width modulator device in the drive circuit in accordance with the current gradient of the actual current through the inductive load.

In this case, the drive circuit according to the invention operates in two different operating modes, namely in a conventional control mode in which the switch is controlled using a PI controller and a downstream pulse width modulator, as explained in connection with FIG. 1. In the second operating mode, the switch is turned on and off directly by the digital assessment circuit.

The method according to the invention functions as follows.

If a rise or fall in the nominal current by a prescribed value is detected, the switch that is in series with the inductive load is turned on or off by the assessment circuit. This means that the assessment circuit provides a pulse duty factor of 100% or 0%. In this case, the assessment circuit can influence the switch 20 directly or can transmit a corresponding control signal to the PI controller. If the nominal current rises or falls by the prescribed level, the switch that is in series with the inductive load is turned on or off. As a result, the current through the inductive load rises or falls at the maximum rate. When the measured current through the inductive load reaches the nominal value, the pulse duty factor of the pulse-width-modulated drive signal for the switch is established on the basis of the current rise or fall behavior. When the period of the pulse-width-modulated drive signal for the switch next starts, this established value is written to the PI controller, and the switch that is in series with the inductive load is then driven in a conventional manner using the control loop (explained in connection with FIG. 1). In this conventional method of operation, the control loop (explained in connection with FIG. 1 and also provided in the invention) ensures that the pulse duty factor is finely adjusted and finely readjusted should there be small discrepancies between the actual current through the inductive load and the nominal current on account of calculation inaccuracies.

The algorithm for determining the pulse duty factor that is needed to keep the average current at a particular value uses the gradient of the current through the inductive load, if the pulse duty factor was set to 100% for the first time, and that gradient which the current through the inductive load has when the nominal current is reached.

In this case, the pulse duty factor can be determined from the quotient $(k0-k1)/k0$, where $k0$ is the gradient of the current at time $t=0$ and $k1$ is the gradient of the current when the prescribed nominal value is reached. The pulse duty factor can also be determined from a quotient that is proportional thereto.

BRIEF DESCRIPTION OF THE DRAWINGS

The invention will be explained in more detail below in connection with an exemplary embodiment and a plurality of figures, in which:

FIG. 5 shows the transient response of the actual current through the inductive load, in a circuit arrangement according to the invention (shown in FIG. 2) in comparison with a known drive circuit (shown in FIG. 1), in the case of a current jump from 0 to 2 amperes, if the inductive load has an inductance of 16 mH, and FIG. 6 shows a similar illustration to FIG. 5, provision being made of a current jump from 0 to 600 mA, and the inductive load having an inductance of 9 mH.

DETAILED DESCRIPTION

In the following figures, unless specified otherwise, identical reference symbols designate identical parts with the same meaning.

Figure 1:
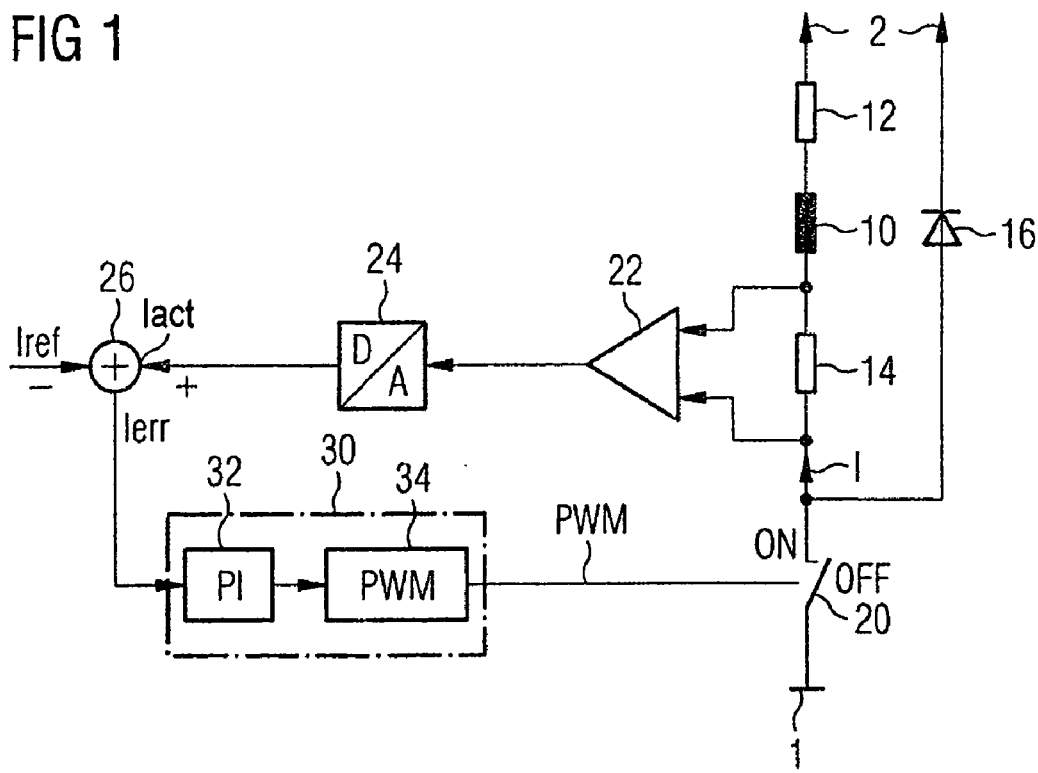
FIG. 1 shows a known drive circuit for driving inductive loads in a pulse-width-modulated manner.
Figure 2:
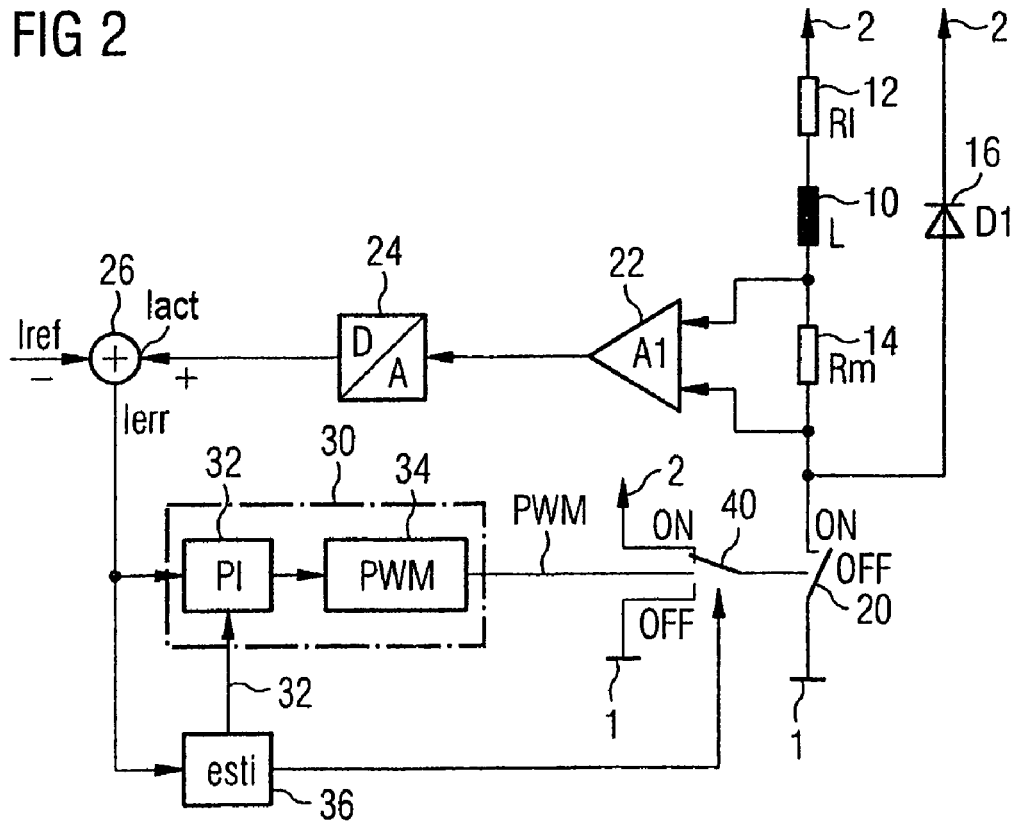
FIG. 2 shows an example of a drive circuit for driving pulse-width-modulated inductive loads in accordance with the invention.

FIG. 2 shows a circuit arrangement for driving an inductive load 10. The circuit arrangement largely corresponds to the drive circuit of FIG. 1 but has been extended by two decisive circuit components. The reference symbols which have already been disclosed continue to represent the elements which have already been explained. In addition, the circuit arrangement of FIG. 2 has an assessment circuit 36 which is connected, on the input side, to the output of the adder 26. On the output side, the assessment circuit 36 is connected to a switching device 40 and controls the latter. In addition, the assessment circuit 36 has a control line 38 that couples the assessment circuit 36 to the pulse width modulator device 30. In the exemplary embodiment shown in FIG. 2, the control line 38 is connected to the PI controller 32 of the pulse width modulator device.

The switching device 40 can be used to apply three different signals to the switch 20. The first changeover terminal of the switching device 40 is connected to the supply terminal 1 and is accordingly at reference-ground potential. The second input terminal of the switching device 40 is connected to the output of the pulse width modulator 34, and a positive supply voltage is applied to the third changeover terminal of the switching device 40. Changing over the switching device 40 between these three signals is controlled by the assessment circuit 36. Depending on which control signal is available at the output of the assessment circuit 36, the switching device 40 is connected to the supply terminal 1 that is at reference-ground potential, with the result that the switch 20 is permanently open. If the assessment circuit 36 is used to connect the switching device 40 to the supply terminal 2, this ensures that the switch 20 is permanently closed. If, however, the assessment circuit 36 changes the switching device 40 in such a manner that the output of the pulse width modulator 34 is connected to the switch 20, the switch 20 is turned on and off in a pulse-width-modulated manner using the pulse duty factor determined by the pulse width modulator 34.

The entire drive circuit shown in FIG. 2 is preferably of digital design.

Figure 3:
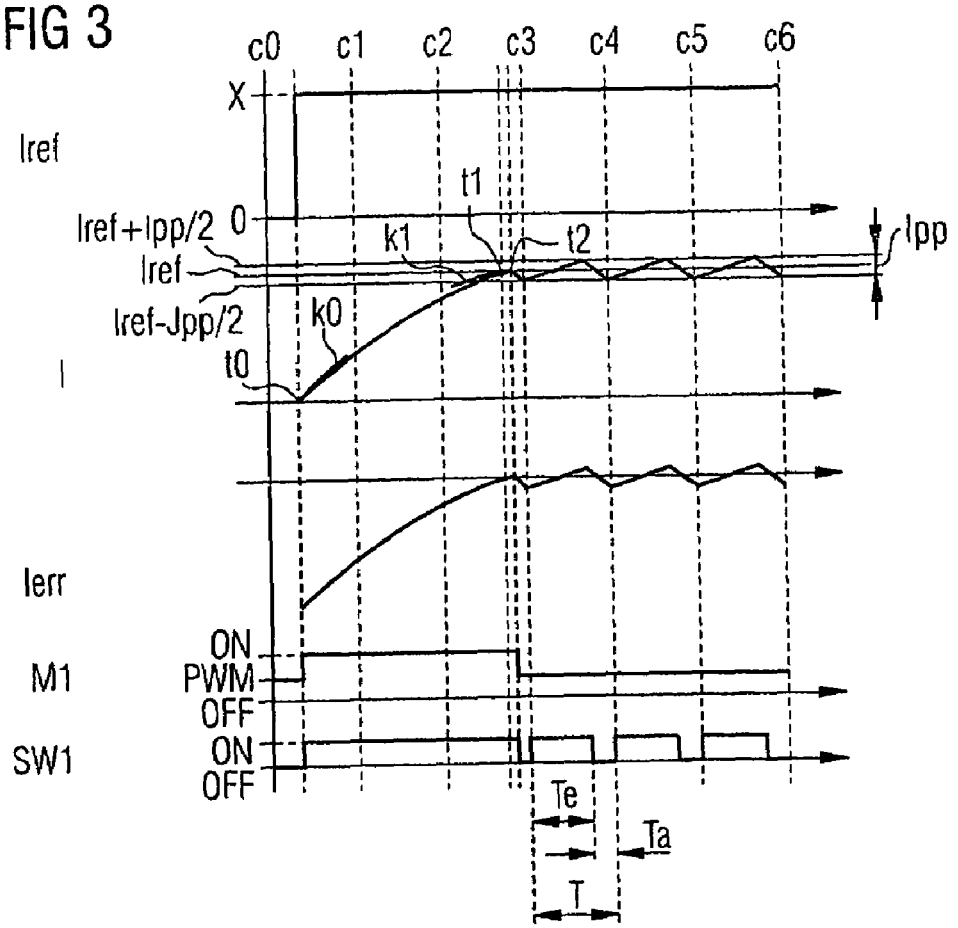
FIG. 3 shows timing diagrams for the drive circuit of FIG. 2.
Figure 4:
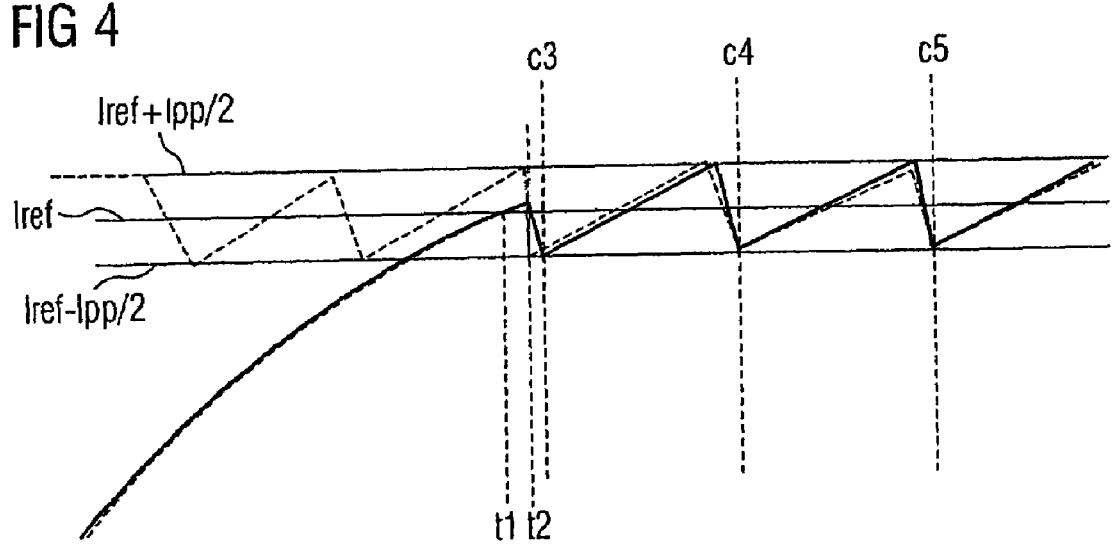
FIG. 4 shows an enlarged detail from the timing diagram of FIG. 3 in the time range when the actual current reaches the nominal current.

The method of operation of the drive circuit shown in FIG. 2 becomes clear in connection with the timing diagrams in FIG. 3 and FIG. 4.

In the timing diagram shown, various curve profiles are shown as a function of time. Successive intervals of time c0, c1, c2 . . . c6 are indicated on the horizontal time axis. Each interval of time lasts one clock period T of the pulse width modulator 34. An abrupt rise in the nominal current Iref is shown, by way of example, at the top of the timing diagram shown. As shown in FIG. 3, the nominal current jumps from a value of 0 to a value of X.

The circuit arrangement of FIG. 2 results in the current I (which flows through the inductive load 10) following the profile of the nominal current Iref in a relatively rapid manner and largely without overshoots. At time t0, at which the current jump of the nominal current Iref rises from 0 to the value X, a fault current Ierr which, in terms of magnitude, corresponds to the value X but which has the opposite mathematical sign is applied to the output of the adder 26. The assessment circuit 36 ensures that the switching device 40 connects the supply terminal 2 to the switch 20, so that the latter is closed. Under the control of the assessment circuit 36, the switch 20 remains closed until time t1. The current I through the inductive load 10 can rise exponentially in accordance with the charging curve. After time t1, the assessment circuit 36 allows the current I to rise further until time t2. Time t2 is determined by the exponential rise in the current I that intersects the output signal of the pulse width modulator, said output signal running in the background. At time t2, the assessment circuit 36 ensures that the switching device 40 connects the output signal of the pulse width modulator 34 to the switch 20. As of this time t2, the pulse width modulator 34 thus controls the switch 20. In this conventional method of operation, the control loop (already explained in connection with FIG. 1 and also provided in the invention) ensures that the pulse duty factor is finely adjusted and finely readjusted should there be small discrepancies between the actual current through the inductive load and the nominal current on account of calculation inaccuracies.

In addition to the signal profiles of the nominal current Iref, the current I through the inductive load 10 and the fault current Ierr, the switching states of the switching device 40 and of the switch 20 are also shown graphically in FIG. 3.

FIG. 4 shows an enlarged illustration of the profile of the current I through the inductive load 10 at times t1 and t2.

So that the current through the inductive load 10 keeps, on average, the nominal value Iref to be achieved, when it is being controlled by the pulse width modulator 34, the following algorithm is used in the assessment circuit. At time t0, the gradient k0 of the rise in the current I is determined. In addition, at time t1, the gradient k1 of the current rise is established. These two values k0 and k1 are used to determine the pulse duty factor Te/Ta of the pulse width modulator 34 in accordance with the following formula:

$$\text{Pulse duty factor} = Te/Ta = \frac{k0 - k1}{k0}.$$

This formula is derived as follows:

Curve profile for current rise:

$$y(t) = A \cdot \left(1 - e^{\frac{-t}{\tau}}\right)$$

$$y'(t) = \frac{A}{\tau} \cdot e^{\frac{-t}{\tau}}$$

Values at time t=0:

$$y(0) = 0 \qquad y'(0) = \frac{A}{\tau}$$

Values at the present time:

$$y(tpres) = A \cdot \left(1 - e^{\frac{-tpres}{\tau}}\right)$$

$$y'(tpres) = \frac{A}{\tau} \cdot e^{\frac{-tpres}{\tau}}$$

Convert equation for y:

$$y(tpres) = A \cdot \left(1 - \frac{\tau}{A} \cdot y'(tpres)\right)$$

$$= A - \tau \cdot y'(tpres)$$

$$= A - \frac{A}{y'(0)} \cdot y'(tpres)$$

$$= A \cdot \left(1 - \frac{y'(tpres)}{y'(0)}\right)$$

$$= A \cdot \left(1 - \frac{kpres}{k0}\right)$$

Final value:

$$A = \frac{ypres}{1 - \frac{kpres}{k0}}$$

Pulse duty factor:

$$= \frac{Inom}{A} = \frac{Inom}{\frac{ypres}{1 - \frac{kpres}{k0}}}$$

Use for Current Controllers:

Only when the current rises are k0, kpres and ypres measured continuously and the value for A continuously updated (or averaged):

$$A = \frac{ypres}{1 - \frac{kpres}{k0}}$$

When the current rises and falls, the pulse duty factor is calculated using the following formula:

$$\text{Pulse duty factor} = \frac{Inom}{A}$$

When the current rises and the nominal current has been reached, Inom=ypres. In this case, the duty cycle can therefore also be calculated in accordance with the following formula:

$$\text{Pulse duty factor} = \text{duty\_pres} = \frac{Inom}{\frac{ypres}{1 - \frac{kpres}{k0}}} = \frac{k0 - kpres}{k0}$$

The fundamental advantage of this method is that all information for determining the pulse duty factor Te/Ta is available at any time for the current I. This is important because delays in calculating the pulse duty factor after the nominal current Iref has been reached may lead to overshoots during control, and the adjustment time would therefore be extended considerably.

FIG. 5 compares the transient response of a conventional drive circuit (shown in FIG. 1) with the transient response of a drive circuit according to the invention (shown in FIG. 2). In this case, it is assumed that the nominal current Iref jumps from 0 A to 2 A and the inductive load has an inductance of 16 mH. Curve profile A shows the transient response of a conventional drive circuit (shown in FIG. 1) and curve profile B shows the transient response in the case of the method according to the invention using a drive circuit as shown in FIG. 2. It can clearly be seen that curve profile B overshoots to a lesser degree than curve profile A. In addition, the nominal value is reached more quickly in the case of curve B.

FIG. 6 shows a similar curve profile. However, provision is made of a current jump from 0 A to 600 mA, and the inductive load has an inductance of 9 mH. It can be seen that, in accordance with curve profile B, the value of the nominal current is likewise achieved more quickly with the drive circuit according to the invention or with the use of the method according to the invention, even though this is less pronounced than in the case of larger current jumps of the nominal current.

| List of reference symbols | |
|---|---|
| 1 | Supply terminal |
| 2 | Supply terminal |
| 10 | Inductive load |
| 12 | Resistor |
| 14 | Resistor |
| 16 | Diode |
| 20 | Switch |
| 22 | Amplification |
| 24 | A/D converter |
| 26 | Adder |
| 30 | Pulse width modulator device |
| 32 | PI controller |
| 34 | Pulse width modulator |
| 36 | Assessment circuit |
| 38 | Control line |
| 40 | Switch |
| T | Clock period |

-continued

| List of reference symbols | |
|---|---|
| Te | Turned-on time |
| Ta | Turned-off time |
| t0 | Time |
| t1 | Time |
| t2 | Time |
| Iref | Nominal current |
| I | Current |
| Ierr | Fault current |
| IPP | Current span |
| c0...c6 | Clock periods |
| k0 | Gradient at t0 |
| k1 | Gradient at t1 |
| Iact | Actual current |
| X | Nominal current value |

The invention claimed is:

1. A method for driving an inductive load, said inductive load being arranged in series with a switch between first and second supply voltages, the method comprising:
using the switch to turn on the current to cause a current flowing through the inductive load to move toward a prescribed value;
driving the switch using a pulse width modulator device after the current flowing through the inductive load has substantially reached the prescribed value,
wherein after the prescribed value has been reached, the pulse width modulator device turns the switch on and off using a determined pulse duty factor that is determined at least in part from the current rise behavior at approximately the time when the current was turned on.

2. The method as claimed in claim 1, wherein the switch is driven by the pulse width modulator device immediately after the prescribed value has been reached.

3. The method as claimed in claim 1, wherein the pulse width modulator device drives the switch using a variable pulse duty factor after the prescribed nominal current has been reached once and the determined pulse duty factor has been set, the variable pulse duty factor being determined by the control loop that includes the pulse width modulator device.

4. The method as claimed in claims 1, wherein the determined pulse duty factor is determined based on a quotient $(k_0-k_1)/k_0$, where $k_0$ is a gradient of the current at approximately the time the current is turned on and $k_1$ is a gradient of the current when the prescribed value is reached.

5. The method as claimed in claim 1, wherein as early as after the current has been turned on, the pulse width modulator device provides a pulse width-modulated output signal whose pulse duty factor is varied continuously, in accordance with the current rise behavior, until the prescribed value is reached.

6. The method as claimed in claim 1, wherein the current remains turned on in an interval of time between reaching the prescribed value and a time at which the pulse width modulator device controls the switch.

7. A drive circuit for an inductive load, comprising:
a switch operable to controllably connect the inductive load between supply terminals, said switch configured to be operably turned on and off in accordance with a pulse width modulator device, in order to keep a current which is flowing through the inductive load at least approximately at a prescribed nominal value; and
an assessment circuit coupled to the pulse width modulator device is provided for the purpose of establishing a first pulse duty factor of the pulse width modulator device in a manner dependent on a rise and/or decay behavior prior to the current reaching a nominal current, the assessment circuit configured to establish the first pulse duty factor in the pulse width modulator device when the nominal current is reached.

8. The drive circuit as claimed in claim 7, wherein the switch is configured to be continuously turned on by the assessment circuit, to be continuously turned off by the assessment circuit, and to be controlled by the pulse width modulator device.

9. The drive circuit as claimed in claim 8, wherein the pulse width modulator device includes a PI controller and a series connected pulse width modulator.

10. The drive circuit as claimed in claim 7, further comprising:
a resistor connected in series with the inductive load,
a measurement circuit configured to obtain a measure of instantaneous current through the inductive load from the resistor;
a comparator circuit operably coupled to receive the measure of the instantaneous current and a nominal value, the comparator circuit operable to generate a difference between the measure of the instantaneous current and the nominal value, the comparator circuit configured to provide the difference to an input of the pulse width modulator device.

11. The drive circuit as claimed in claim 10, wherein the comparator circuit includes an analog/digital converter.

12. The drive circuit as claimed in claim 9, further comprising a second switch coupled to a control terminal of the switch, the second switch operable to alternatively and controllably couple the control terminal of the switch to each of a first supply voltage, a second supply voltage, and the pulse width modulator.

13. The drive circuit as claimed in claim 8, further comprising a second switch coupled to a control terminal of the switch, the second switch operable to alternatively and controllably couple the control terminal of the switch to each of a first supply voltage, a second supply voltage, and the pulse width modulator device.

14. The drive circuit as claimed in claim 8, wherein the established first pulse duty factor is determined based on a quotient $(k_0-k_1)/k_0$, where $k_0$ is a gradient of the current at approximately a time at which the rise and/or decay behavior of the current commences, and $k_1$ is a gradient of the current when the nominal current is reached.

15. A method for driving an inductive load, said inductive load being arranged in series with a switch between first and second supply voltages,
driving the switch using a pulse width modulator device under a first condition,
upon detection of a second condition, causing the switch to continuously be in a first state to cause a current flowing through the inductive load to move toward a prescribed value; and
resume driving the switch using a pulse width modulator device after the current flowing through the inductive load has substantially reached the prescribed value, wherein after the prescribed value has been reached, the pulse width modulator device turns the switch on and off using a determined pulse duty factor that is determined at least in part from the current change behavior at approximately the detection of the second condition.

16. The method as claimed in claim 15, wherein the switch is driven by the pulse width modulator device immediately after the prescribed value has been reached.

17. The method as claimed in claim 15, wherein the pulse width modulator device drives the switch using a variable pulse duty factor after the prescribed nominal current has been reached once and the determined pulse duty factor has been set, the variable pulse duty factor being determined by the control loop that includes the pulse width modulator device.

18. The method as claimed in claims 15, wherein the determined pulse duty factor is determined based on a quotient (k0−k1)/k0, where k0 is a gradient of the current at approximately the time the switch is placed in the first state and k1 is a gradient of the current when the prescribed value is reached.

19. The method as claimed in claim 15, wherein as early as after the switch in placed in the first state, the pulse width modulator device provides a pulse width-modulated output signal whose pulse duty factor is varied continuously, in accordance with the current rise behavior, until the prescribed value is reached.

20. The method as claimed in claim 15, wherein the switch remains in a first state in an interval of time between reaching the prescribed value and a time at which the pulse width modulator device controls the switch.

* * * * *